(12) United States Patent
Tam

(10) Patent No.: US 7,705,825 B2
(45) Date of Patent: Apr. 27, 2010

(54) METHOD FOR MEASURING EFFECTIVE OPERATION OF GYRICON DISPLAY DEVICE

(75) Inventor: Man-Chung Tam, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 919 days.

(21) Appl. No.: 11/461,310

(22) Filed: Jul. 31, 2006

(65) Prior Publication Data

US 2008/0024466 A1    Jan. 31, 2008

(51) Int. Cl.
*G09G 3/34* (2006.01)
(52) U.S. Cl. .................................. 345/107; 359/296
(58) Field of Classification Search .................. None
See application file for complete search history.

(56) References Cited

U.S. PATENT DOCUMENTS

| | | | |
|---|---|---|---|
| 3,668,106 A | 6/1972 | Ota | |
| 4,126,854 A | 11/1978 | Sheridon | |
| 4,272,596 A | 6/1981 | Harbour et al. | |
| 5,059,909 A * | 10/1991 | O'Brien | 324/457 |
| 5,717,514 A | 2/1998 | Sheridon | |
| 5,808,783 A * | 9/1998 | Crowley | 359/296 |
| 6,017,584 A | 1/2000 | Albert et al. | |
| 6,113,810 A | 9/2000 | Hou et al. | |
| 6,492,967 B2 * | 12/2002 | Sheridon et al. | 430/110.1 |
| 6,512,354 B2 * | 1/2003 | Jacobson et al. | 324/71.1 |
| 6,525,866 B1 | 2/2003 | Lin et al. | |
| 6,577,433 B1 | 6/2003 | Lin et al. | |
| 6,753,844 B2 * | 6/2004 | Machida et al. | 345/107 |
| 6,980,352 B1 | 12/2005 | Tam | |
| 2002/0005832 A1 * | 1/2002 | Katase | 345/107 |
| 2002/0036607 A1 * | 3/2002 | Takahashi et al. | 345/87 |
| 2003/0132925 A1 | 7/2003 | Lin et al. | |
| 2003/0137521 A1 * | 7/2003 | Zehner et al. | 345/589 |

OTHER PUBLICATIONS

U.S. Appl. No. 11/461,188, filed Jul. 31, 2006 in the name of Naveen Chopra et al.
U.S. Appl. No. 11/169,924, filed Jun. 30, 2005 in the name of Ping Liu et al.
U.S. Appl. No. 11/419,436, filed May 19, 2006 in the name of Naveen Chopra et al.
U.S. Appl. No. 11/419,472, filed May 19, 2006 in the name of Man-Chung Tam et al.

* cited by examiner

*Primary Examiner*—Alexander Eisen
*Assistant Examiner*—Matthew Yeung
(74) *Attorney, Agent, or Firm*—Oliff & Berridge, PLC

(57) ABSTRACT

A method of making a gyricon display device, and a method of determining a monopole charge and a dipole charge of beads in a gyricon display device, is set forth. In the methods, a rectangular waveform switching voltage is applied to the gyricon display device and the reflectance of the display device is measured in order to determine the dipole charge based upon the measured reflectance, and a triangular waveform switching voltage is applied to the gyricon display device and current of the display device is measured to determine the monopole charge based upon the measured current.

20 Claims, 10 Drawing Sheets

METHOD FOR MEASURING EFFECTIVE OPERATION OF GYRICON DISPLAY DEVICE

BACKGROUND

Described herein is a method of measuring the operational effectiveness of a gyricon display device, and a method of making gyricon display devices using such method. More particularly, described is a method of measuring the monopole and dipole charges of the gyricon beads of the device to determine if the device is able to properly display images.

Gyricon displays are capable of generating images, including full color images. The gyricon displays herein may be used for any display application, and particularly any display application where the image displayed may be changed, including, for example, reimageable paper, electronic books, electronic signage, watch, monitor and/or cell phone displays, and the like.

An advantage associated with the methods described herein is that a given gyricon display device, once assembled, can be readily evaluated for effectiveness in displaying images, thereby improving quality control over gyricon display devices. Using the evaluation method herein, additional display devices having a same high quality display can be replicated.

REFERENCES

Gyricon elements, balls, spheres, particles or beads (hereinafter collectively referred to as "beads") typically comprise small spherical beads that have an optical and an electrical anisotropy. In a basic bichromal (two color) bead, the aforementioned properties generally result from each hemisphere surface having a different color and electrical charge. Multiple color gyricon beads in which different portions of the surface of the bead comprise different colors are also possible. U.S. Pat. No. 5,717,514, incorporated herein by reference in its entirety, shows polychromal segmented beads.

Gyricon displays, also called twisting-ball displays, rotary ball displays, particle displays, dipolar particle light valves, or reimageable displays, offer a technology for making a form of a reimageable display or electric paper. A gyricon display is an addressable display made up of a multiplicity of optically anisotropic display beads, each located within a fluid-filled cavity of a transparent sheet such as an elastomer or within a fluid-filled shell, and each of which can be selectively rotated to present a desired face to an observer. For example, a gyricon display can incorporate beads each having two distinct hemispheres, one black and the other white, with each hemisphere having a distinct electrical characteristic (for example, zeta potential with respect to a dielectric fluid) so that the beads are electrically as well as optically anisotropic. In displays in which the beads are embedded in a sheet of optically transparent material, such as an elastomer layer, that contains a multiplicity of spheroidal cavities and is permeated by a transparent dielectric fluid, such as a plasticizer, the fluid-filled cavities accommodate the beads, one ball per cavity, so as to prevent the beads from migrating within the sheet. A ball can be selectively rotated within its respective fluid-filled cavity, for example by application of an electric field, so as to present either the black or the white hemisphere to an observer viewing the surface of the sheet. Thus, by application of an electric field addressable in two dimensions (as by a matrix addressing scheme), the gyricon beads rotate in response thereto, thereby presenting either a black or white side surface to the viewer.

U.S. patents related to gyricon displays and gyricon beads, each incorporated herein by reference in their entireties, include U.S. Pat. Nos. 5,262,098, 5,344,594, 5,389,945, 5,717,514, 5,815,306, 5,989,629, 6,097,531, 6,445,496, 6,492,025, 6,488,870, 6,663,802 and 6,980,352.

What is desired is a desirable method for measuring the operational effectiveness of a gyricon display in order to confirm that the display is capable of adequately and properly displaying images, and a method of making gyricon display devices having such display capabilities.

SUMMARY

In embodiments, described is a method of making a gyricon display device, comprising locating a display layer between conductive substrates, wherein the display layer comprises beads that exhibit at least two colors of different reflectance disposed within a fluid filled cavity or shell, to form a gyricon display device; applying a rectangular or triangular waveform switching voltage to the gyricon display device and measuring reflectance of the gyricon display device; and separately applying a triangular waveform switching voltage to the gyricon display device and measuring current of the display device.

In further embodiments, described is a method of making a gyricon display device, comprising preparing a first gyricon display device comprising a display layer between conductive substrates, wherein the display layer comprises beads that exhibit at least two colors of different reflectance disposed within a fluid filled cavity or shell, to form the first gyricon display device; applying a first waveform switching voltage to the first gyricon display device and measuring reflectance of the gyricon display device; applying a second waveform switching voltage to the first gyricon display device and measuring current of the display device; comparing the measured reflectance to the measured current; and if the measured reflectance and measured current indicate that a transition in the reflectance under influence of the switching voltage is substantially complete prior to an end point of a spike in the current under influence of the switching voltage, producing a second gyricon display device identical to the first gyricon display device.

In still further embodiments, described is a method of making gyricon display devices, comprising preparing a first gyricon display device comprising a display layer between conductive substrates, wherein the display layer comprises beads that exhibit at least two colors of different reflectance disposed within a fluid filled cavity or shell, to form the first gyricon display device; applying a first waveform switching voltage to the first gyricon display device and measuring reflectance of the gyricon display device, and determining a dipole charge of the beads based upon the measured reflectance; applying a second waveform switching voltage to the first gyricon display device and measuring current of the display device, and determining a monopole charge of the beads based upon the measured reflectance; determining a ratio of the dipole charge to the monopole charge for the beads, wherein if the measured reflectance and measured current indicate that a transition in the reflectance under influence of the switching voltage is substantially complete to complete prior to an end point of a spike in the current under influence of the switching voltage, setting a tolerance for the ratio in which the beads would exhibit an acceptable display efficiency; and preparing additional beads and determining a dipole charge to monopole charge for the additional beads, and determining if the dipole charge to monopole charge of the additional beads is within the set tolerance so that the additional beads may be used in preparing an additional display device identical in structure to the first gyricon display device.

EMBODIMENTS

Figure 1:
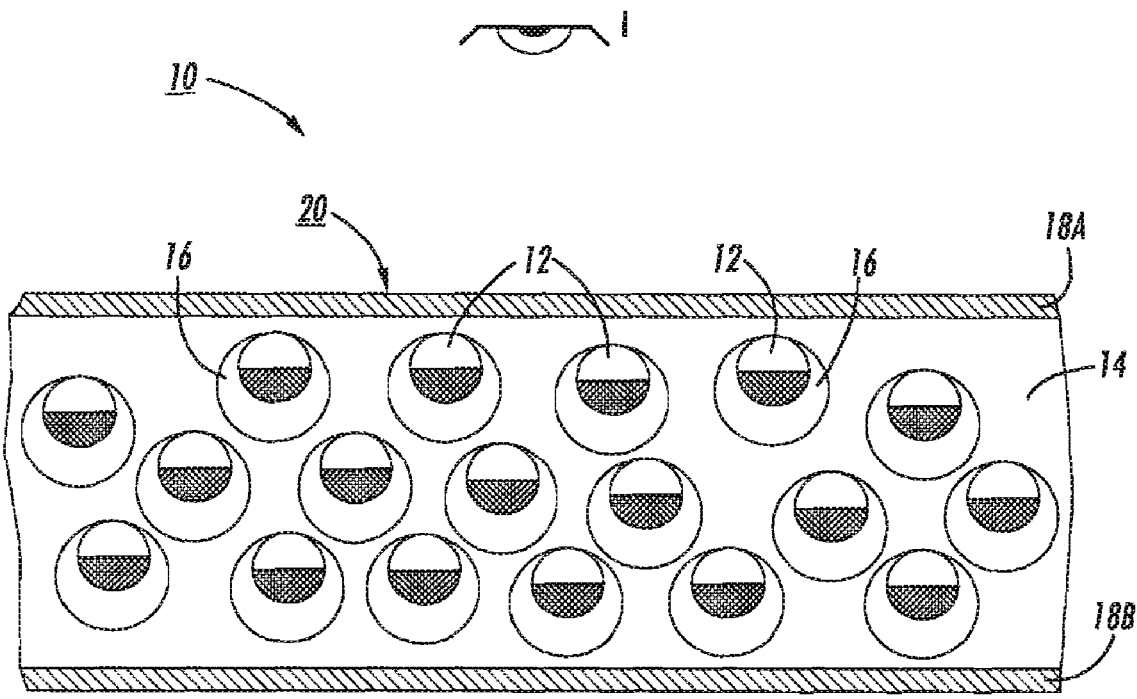
FIG. 1 illustrates an embodiment of a gyricon display device.
Figure 2:
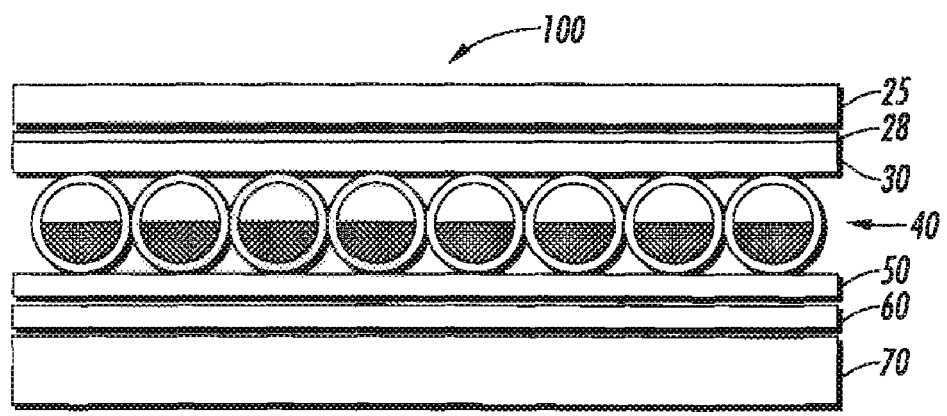
FIG. 2 illustrates another embodiment of a gyricon display device.

FIGS. 1 and 2 illustrate example gyricon displays that may be evaluated by the methods described herein.

In FIG. 1, a gyricon display 10 is shown. In the pictured embodiment, the gyricon beads are each two color bichromal beads, and specifically are bichromal black and white beads. The bichromal beads 12 are disposed in an elastomer binder of the sheet/display layer 14. Each bichromal bead is located in a cavity, or pocket, 16 of the display layer 14. The cavities 16 also contain a dielectric fluid in which the bichromal beads 12 are free to move and rotate. The bichromal beads 12 are electrically dipolar in contact with the fluid and are subject to rotation upon application of an electric field, for example as applied by matrix-addressable electrodes associated with conductive substrates 18A and 18B. The conductive substrates are located on each side of the display device, and sandwich the display layer therebetween. An observer at I sees an image formed by the black and white pattern of the bichromal beads 12 as rotated to expose their different colored faces (hemispheres) to the viewing surface 20 of the display device.

In FIG. 2, a display device 100 comprises an optional protective layer 25, a first addressing electrode and conductive substrate 28, a first adhesive layer 30, a display layer of bichromal beads 40 comprised of the beads encapsulated within a fluid-filled shell, a second adhesive layer 50, a second addressing electrode and conductive substrate 60, and an optional supporting substrate 70. In the pictured embodiment, the display layer is comprised of a monolayer of the beads. A display of this type is described in, for example, U.S. Pat. No. 6,980,352, incorporated herein by reference in its entirety.

The display device may have any suitable overall length and width as desired or required. The display device may also be made to have any desired height, although a total height of from about 10 to about 10,000 μm, such as from about 30 to about 1,000 μm or from about 50 to about 300 μm, may be used in terms of size and ease of use of the device. The display layer of the display device may have a thickness of from, for example, about 5 to about 10,000 μm, such as from about 10 to about 1,000 μm or from about 20 to about 300 μm.

The gyricon beads may be bichromal or polychromal, as discussed above. For bichromal beads 12, the rotatable beads have hemispherical coatings of different zeta potential. For example, the difference in zeta potential can be achieved by comprising the bead material of, or by applying a coating to one hemisphere of the beads of, a material that exhibits optical absorption characteristics, and by comprising the bead material of, or by applying a coating to the other hemisphere of the beads of, a material that exhibits light reflectance characteristics. The difference between the light reflectance-light absorption characteristics of the hemispheres provides a desired optical anisotropy. The beads may be comprised of any suitable materials and coatings. As an example, the beads may be comprised of black polyethylene beads with a light reflective material, for example titanium oxide, sputtered on one hemisphere to provide the beads with the desired light reflective and light absorptive hemispheres. The rotating gyricon beads may have a size of from, for example, about 0.5 to about 800 μm, such as from about 5 to about 300 μm or from about 10 to about 150 μm, in volume average diameter as measured by a suitable measuring device, for example a measuring microscope or Coulter counter.

The dielectric fluid may be comprised of any suitable fluid known in the art for use in displays. In embodiments, the fluid may have a low dielectric constant, for example, about 4 or less, such as about 0.5 to about 2. The viscosity of the fluid may be relatively low at the temperatures of operation in order to permit the beads to move and rotate therein, for example under the influence of an electrical field. In embodiments, the fluid may have a kinematic viscosity in the range of about 0.25 centistokes to about 10 centistokes, for example from about 0.5 centistokes to about 5 centistokes or from about 1 centistoke to about 2 centistokes, at about room temperature (about 23° C. to about 27° C.).

Organic solvents such as halogenated organic solvents, saturated linear or branched hydrocarbons, silicone oils, and low molecular weight halogen-containing polymers are a few suitable types of fluids that may be used. Organic solvents may include, for example, epoxides such as, for example, decane epoxide and dodecane epoxide, vinyl ethers such as, for example, cyclohexyl vinyl ether, and aromatic hydrocarbons such as, for example, toluene and naphthalene. Halogenated organic solvents may include, for example, tetrafluorodibromoethylene, tetrachloroethylene, trifluorochloroethylene, 1,2,4-trichlorobenzene, carbon tetrachloride, mixtures thereof and the like. These materials may have high densities. Hydrocarbons may include, for example, decane, dodecane, tetradecane, xylene, toluene, hexane, cyclohexane, benzene, the aliphatic hydrocarbons in the ISOPAR™ (Exxon), NORPAR™ (a series of normal paraffinic liquids from Exxon), SHELL-SOL™ (Shell), and SOLTROL™ (Shell) series, naphtha, and other petroleum solvents. These materials may have low densities. Examples of silicone oils include octamethyl cyclosiloxane and higher molecular weight cyclic siloxanes, poly(methyl phenyl siloxane), hexamethyldisiloxane and polydimethylsiloxane. These materials may have low densities. A commercially available silicone fluid includes DOW 200, a polydimethylsiloxane polymer available from Dow Corning. Other examples of suitable silicone fluids include polydimethylsiloxane fluids available from Gelest Corporation such as trimethylsiloxy terminated fluids DMS-T00, DMS-T01, DMS-T01.5, DMS-T02, DMS-T03, DMS-T05, DMS-T07, DMS-T11; cyclomethicones such as SIO6700.0, SID2650.0, SID4625.0 (also known as D4, D5, and D6 fluids, respectively); phenylmethylsiloxanes such as PMM-0011, PDM-7040; fluorosilicones such as SIB1816.0; polydiethylsiloxanes such as DES-T03, DES-T11; branched and low viscosity phenyltris(trimethylsiloxy)silane fluids such as SIP6827.0, phenethyltris(trimethylsiloxy)silane fluids such as SIP6722.8, and the like. Low molecular weight halogen-containing polymers may include, for example, poly(chlorotrifluoroethylene) polymer or KRYTOX™ polymers (Dupont).

In embodiments where it is necessary for the fluid to swell the binder layer in order to fill the cavities therein, partially fluorinated materials such as, for example, 3M HFE 7100, a partially fluorinated hydrocarbon made by 3M, ISOPAR L or ISOPAR M, which are aliphatic hydrocarbons made by Ashland Chemicals, or Freon TF, a partially fluorinated polyethylene, may be used. 3M HFE 7100 swells an elastomeric binder about 10%, Freon TF swells an elastomeric binder about 40%, and ISOPAR swells a binder about 25%.

The fluid may optionally be colored. If colored, the fluid may be colored by any suitable means in the art, including through the inclusion of suitable dispersible colorants such as dyes and/or dispersible pigments therein.

Additional materials that may be used to form the beads, the binder of the display layer having the beads therein, the fluid in which the beads are associated, and the like are all known in the art. See, for example, any of the U.S. patents mentioned in the background section above. Further discussion of the materials of the display layer and gyricon beads are thus omitted herein.

As the conductive substrates of the display device, any suitable materials may be used without limitation, for example including materials presently known and used or that may be used in the future in the art. At least one of the conductive substrates, in particular at least the top conductive substrate through which the images formed by the device may be viewed, should be transparent in order to enable such viewing. Both conductive substrates may be transparent, if desired. The bottom or back conductive substrate need not be transparent, and may instead be, for example, a light reflecting or light absorbing material. As suitable materials that may be used, mention may be made of conductive polymer films, for example polymer films coated with a transparent conductive material such as indium tin oxide (ITO), such as polyethylene terephthalate (PET) films, for example MYLAR (Du Pont), polyethylene napthalate (PEN) films, polyethersulfone (PES) films and the like, conductive glass films, such as ITO coated glass, and conductive thin metals. For transparency, ITO coated polymer films and glass are suitable. The conductive substrates may either be flexible or rigid.

The conductive substrates that sandwich the display layer therebetween may have a length and width corresponding to the overall length and width of the display device. The substrates may be continuous, unitary films, or may be comprised of a plurality of segregated films. The substrates may be made to be as thin as possible while still maintaining appropriate conductive properties and structural integrity. For example, the substrates may have a height, or thickness, of from about 10 microns to about 500 µm, such as from about 10 to about 250 µm or from about 20 to about 100 µm.

In embodiments, the display layer may be physically attached to the first conductive substrate or to any intermediate films between the display layer and the conductive substrates, which may be done by any suitable method. Adhesive may be used for convenience, although other attachment methods such as sputtering deposition of the conductive film may also be used.

In operating the display device so as to form an image therewith, an electric field, in particular a reversible direct current or an alternating current, is applied via the electrodes in order to rotate selected ones of the gyricon beads so as to display a desired color surface thereof to a viewer. In embodiments of the display device, each of the individual beads, or a small group of beads, for example a group of from about 1 to about 50 beads or from about 1 to about 30 beads, may be independently addressable by an electrode, that is, a separate electric field may be applied to each individual or small group of gyricon beads in order to generate an appropriate color at that individual location of the device. Appropriate larger sets or groups of different ones of the gyricon beads may also be associated with a same driving electrode, if desired For example, in a display, each bead or a group of beads may represent a pixel or sub-pixel of an image, and each pixel or sub-pixel may thus be separately controlled to generate a desired overall image from the device. In bichromal beads where one hemisphere is black and the other is white, each pixel can be turned on and off by the electrical field applied to that location. Each pixel can be individually addressed, and a full page image can thus be generated. Control methods, including hardware/software, for controlling each bead and/or electrode of the display device in a manner enabling an overall image to be shown are known in the display arts, and any such control method may be applied herein. To permit individual addressability, the size of the electrodes may be the same as or smaller than the size of the individual beads or a small group of beads of the display device, enabling individual control of each. In this manner, the electric field applied to each can be individually controlled. Also, the size of the electrodes can be different (for example, larger than) from the size of the beads, thereby enabling more than one bead to be controlled by a single electrode. Thus, the pattern of the electrodes does not need to line up with the pattern of individual beads of the display layer. Any of the foregoing can be done by, for example, appropriate patterning of the conductive path on one or more of the conductive substrates. An example of the patterning of electrodes can be found in, for example, U.S. Pat. No. 3,668,106, incorporated herein by reference in its entirety.

In gyricon displays, whether the gyricon beads are embedded in an elastomer sheet and the cavities of the sheet are filled with a fluid allowing rotation of the beads or are encapsulated in a fluid-filled shell, a slight space exists between each bead and the cavity or shell wall so that the beads are free to rotate, and migrate in a fluid-filled cavity, in a changing electrical field. During manipulation under the electrical field, the beads first pull off of a side of the cavity/shell upon which the beads have come to rest, and then rotate to display a different color of the beads. The beads then come to rest at the opposite side of the cavity/shell from which each began before being rotated.

In operation, the effectiveness of the gyricon display is typically measured by contrast ratio. Contrast ratio depends on the electrodynamic motions of the gyricon beads within the cavities/shells (hereinafter collectively referred to as cavities for convenience), and optimal performance requires the proper balance between rotational and translational motions of the beads within the cavities. Contrast ratio is degraded if the beads hit the opposite wall of the cavity before completing rotation. This is because the full color of the beads may not be correctly displayed if the beads do not complete rotation before coming to rest against a wall of the cavity. Thus, it is desired for proper and effective operation of the gyricon display that the beads substantially complete to fully complete rotation within the cavities before contacting the opposite side of the cavity as the beads travel across the cavity during rotation.

To date, there has been no method for evaluating the charging characteristics of the gyricon beads as such affect the contrast ratio of a display device including the beads therein. This has made it difficult to optimize the bead-making process parameters and to produce beads with reproducible performance characteristics, and also difficult to develop display devices with optimal display performance.

It is believed that the translational motion of the beads is determined by the monopole charge possessed by the beads, and that the rotational motion of the beads is determined by the dipole charge possessed by the beads. Dipole represents the distinctness of the charge on each side/hemisphere of the beads. However, no experimental technique was known for determining the dipole and monopole charges of the gyricon beads.

In embodiments, described is a method for determining both the monopole and dipole charges of gyricon beads in a display device, and for determining the contrast ratio of such display device. Thus, when a display device is found to have an excellent contrast ratio, the procedures for making that gyricon display device may be replicated in order to reliably produce additional gyricon display devices having excellent contrast ratios and display quality.

In the method, a gyricon display device is evaluated for the monopole and the dipole charges of the beads in the device. Further, a contrast ratio of the device may be evaluated and determined.

Figure 3:
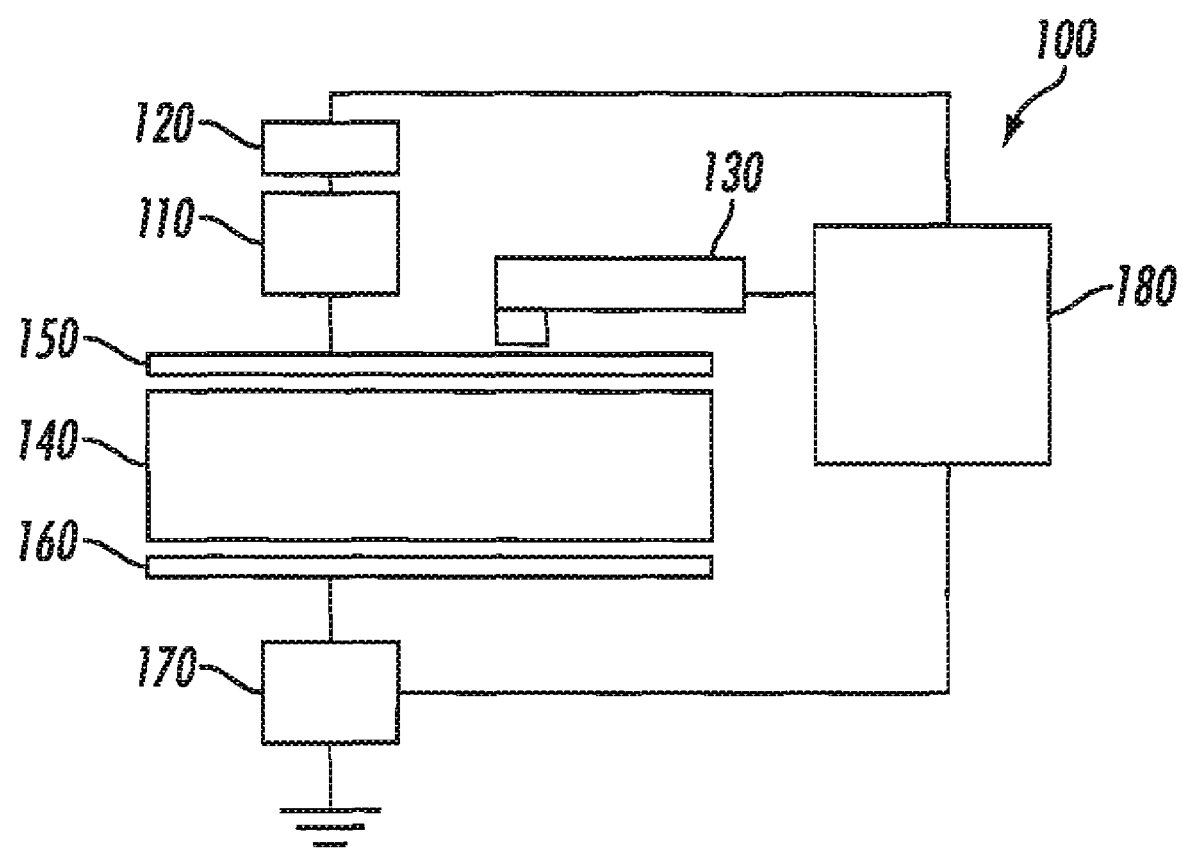
FIG. 3 illustrates a device for measuring charging characteristics of a gyricon display device.

FIG. 3 is a schematic diagram of an apparatus that may be used in the methods described herein. As shown in FIG. 3, the display device, comprised of display layer 140 sandwiched between conductive substrates 150 and 160, may be located within the apparatus 100. An appropriate electric field may be generated via control generator 120 and power supply 110. The power supply/generator may be used to apply either a square/rectangular waveform voltage or a triangular waveform voltage to the display device. The charging (current) is measured by electrometer 170, which monitors the transient current, and this is used is determining the monopole charge of the beads. A commercial electrometer such as a Keithley electrometer may be used. The reflection densitometer 130 measures the change in reflectance of the display as the electric field is switched back and forth by the electric field, which causes rotation of the beads. A commercial densitometer such as a Macbeth TR927 may be used. The system may be controlled by, for example, LabVIEW interface software and a PC 180, which performs processes such as process control as well as data acquisition, analysis and plotting.

In the method, the gyricon display device is mounted in a sample holder of the evaluation apparatus. A rectangular wave or triangular wave switching voltage is applied to the display device, depending on whether the monopole or dipole charge is being determined, as detailed below. In particular, for determining the dynamic reflectivity of the display device and dipole charge of the beads, a rectangular waveform or triangular waveform switching voltage is applied, and for determining dynamic current and monopole charge of the beads, a triangular waveform switching voltage is applied.

In the following description, reference is made to FIGS. 4-11. The gyricon display device used in generating the data summarized in these Figures comprised a fluid swollen sheet sandwiched between two ITO coated glass substrates. Specifically, the gyricon display device is comprised of gyricon beads made of a mixture of black and white pigmented polyethylene waxes. By virtue of the manufacturing process, the beads are not coated with any additional materials. The beads range from about 90 to about 106 μm in diameter. The swollen sheet is a polydimethylsiloxane elastomer (SYLGARD 184, Dow Corporation). The swelling fluid is a polydimethylsiloxane fluid (DOW 200 fluid, 1 cSt viscosity).

Figure 4:
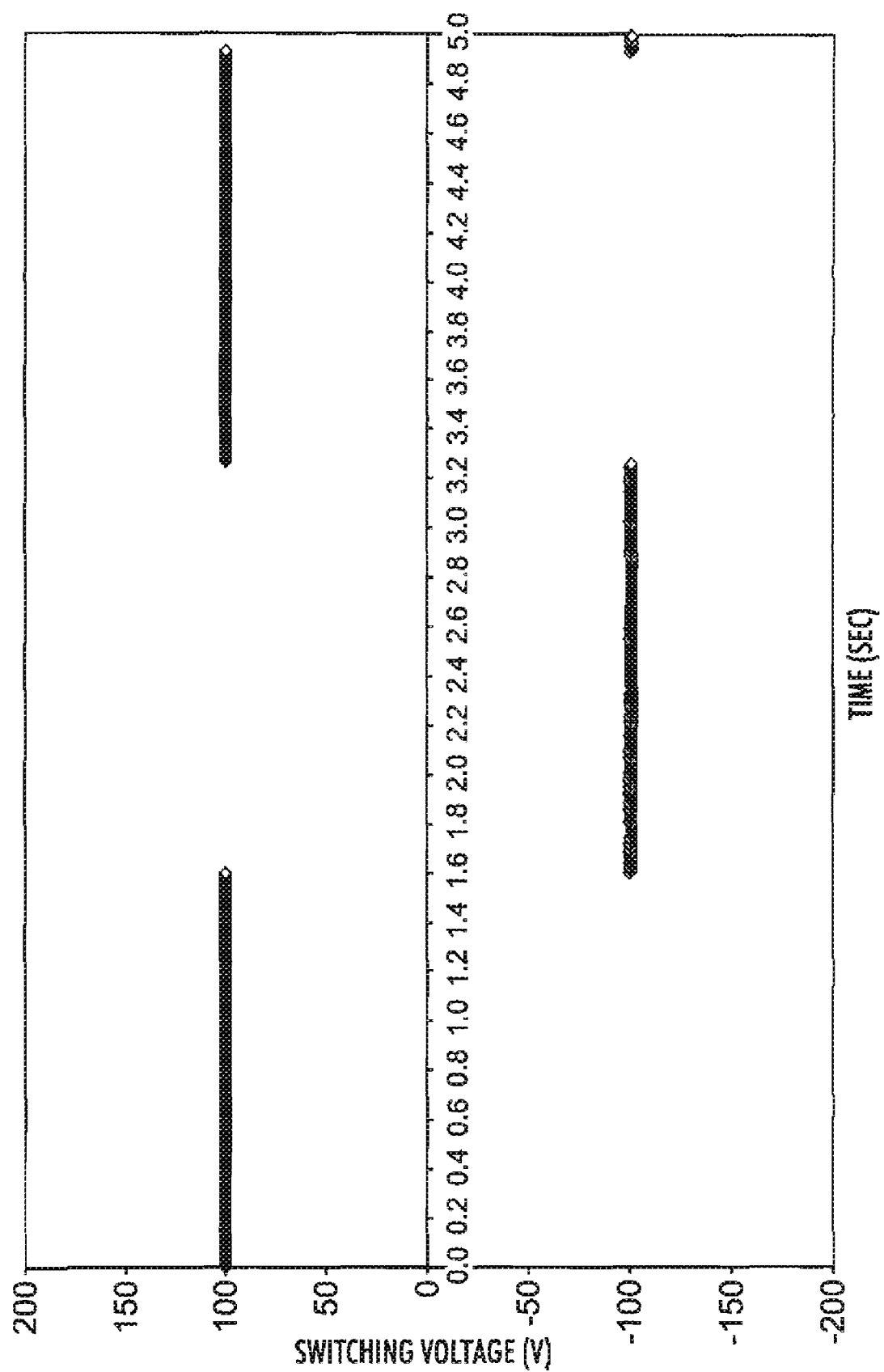
FIGS. 4-8 are plots associated with a determination of the dynamic reflectivity of a gyricon display device.
Figure 5:
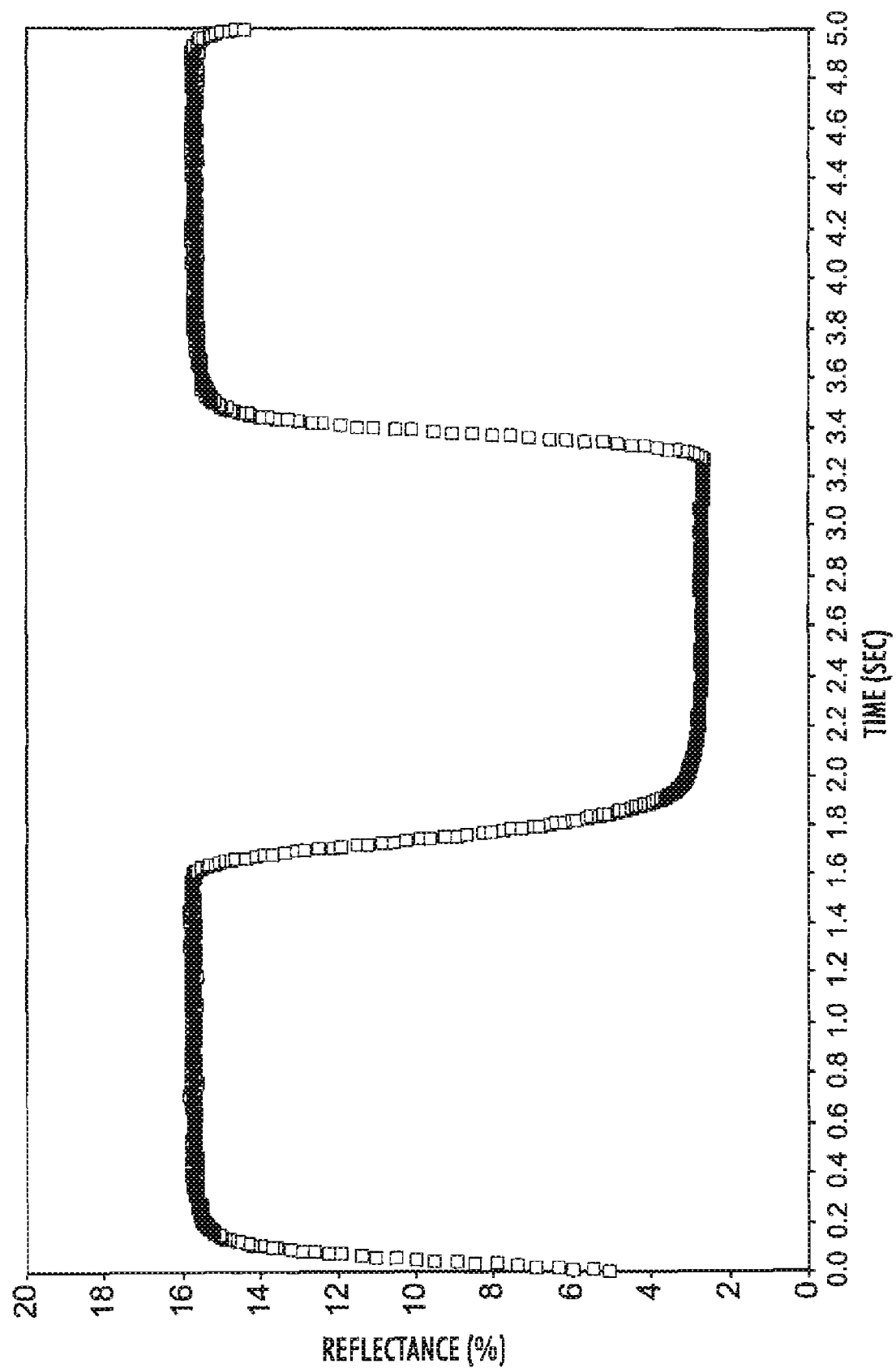

The dynamic reflectivity measurement comprises application of a rectangular waveform switching voltage. For example, as shown in FIG. 4, the voltage is switched abruptly between a positive polarity and a negative polarity, in this case between +100 V and −100 V. Upon application of the electric field sufficient to overcome the adhesive force of the beads to the cavity wall, the beads detach from the cavity wall and translate across the bead and rotate. Thus, in switching the voltage through a display device containing bichromal beads having black and white hemispheres, the beads are made to rotate to display either a white surface of high reflectivity or a black surface of low reflectivity. The reflectance is monitored by the reflection densitometer, for example as shown in FIG. 5. FIG. 5 is a plot of reflectance R, measured as a percentage of light detected upon reflection, as measured upon application of the rectangular waveform switching voltage in FIG. 4. As seen in FIG. 5, the positive voltage causes the higher reflectivity white surface of the beads to be displayed, while switching to the negative voltage causes the low reflectance black surface to be displayed.

Figure 6:
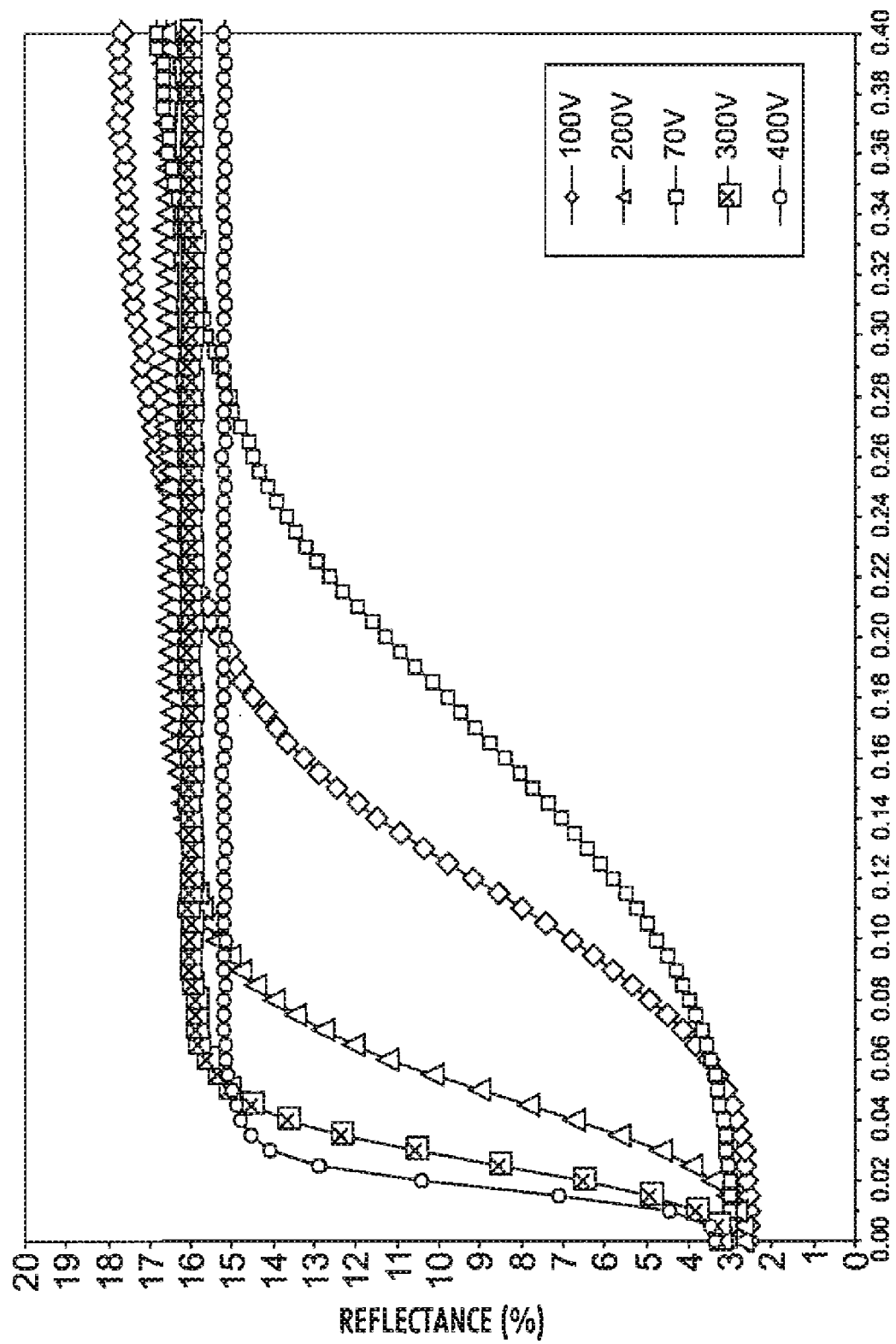

Reflectance data is desirably gathered for a number of different switching voltages, for example as shown in FIG. 6. In FIG. 6, voltages ranging from 70 V to 400 V were used, and the reflectance for each plotted as a function of time. As can be seen in FIG. 6, the use of higher switching voltages causes the transition from high to low reflectance to occur more rapidly.

Figure 7:
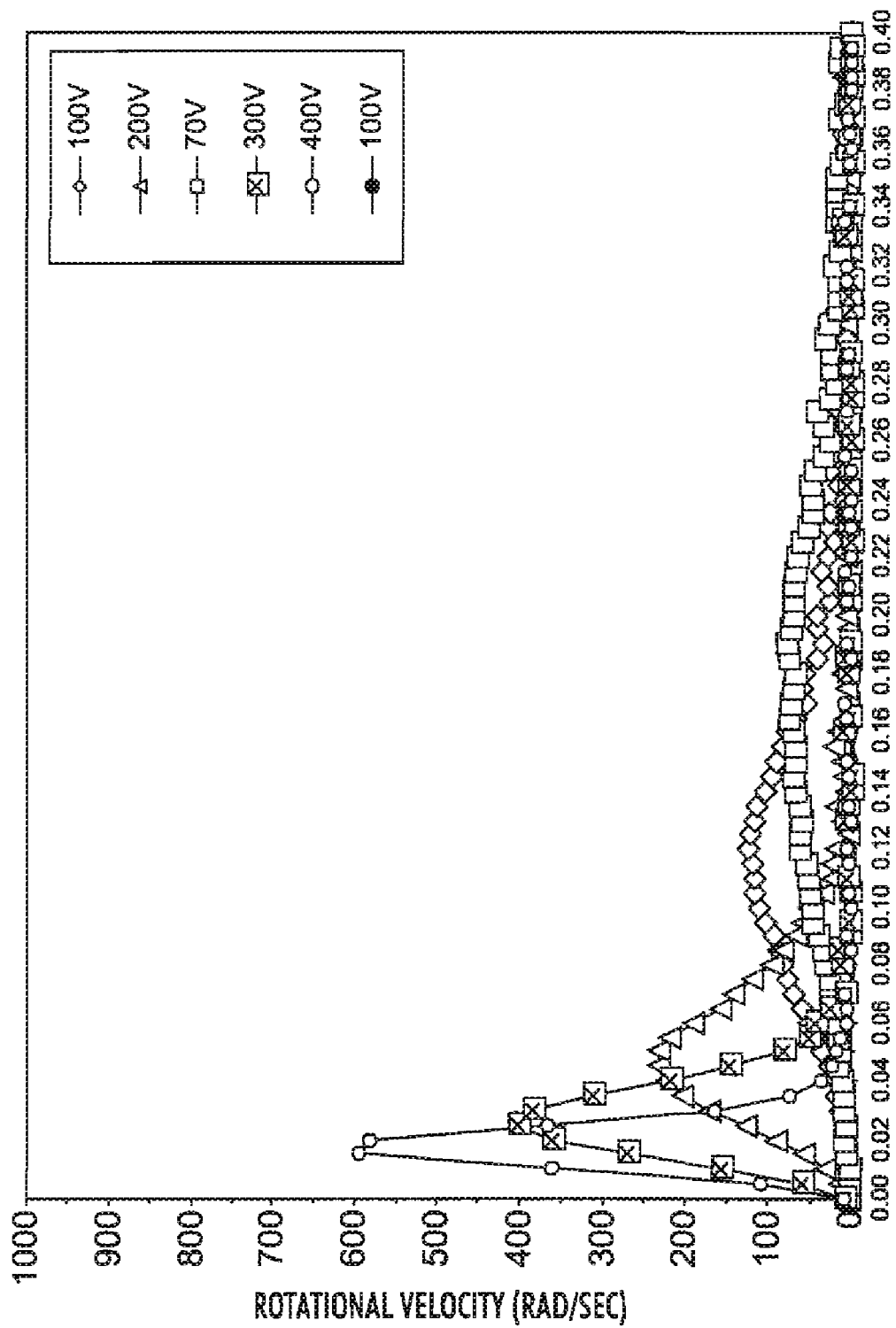
Figure 8:
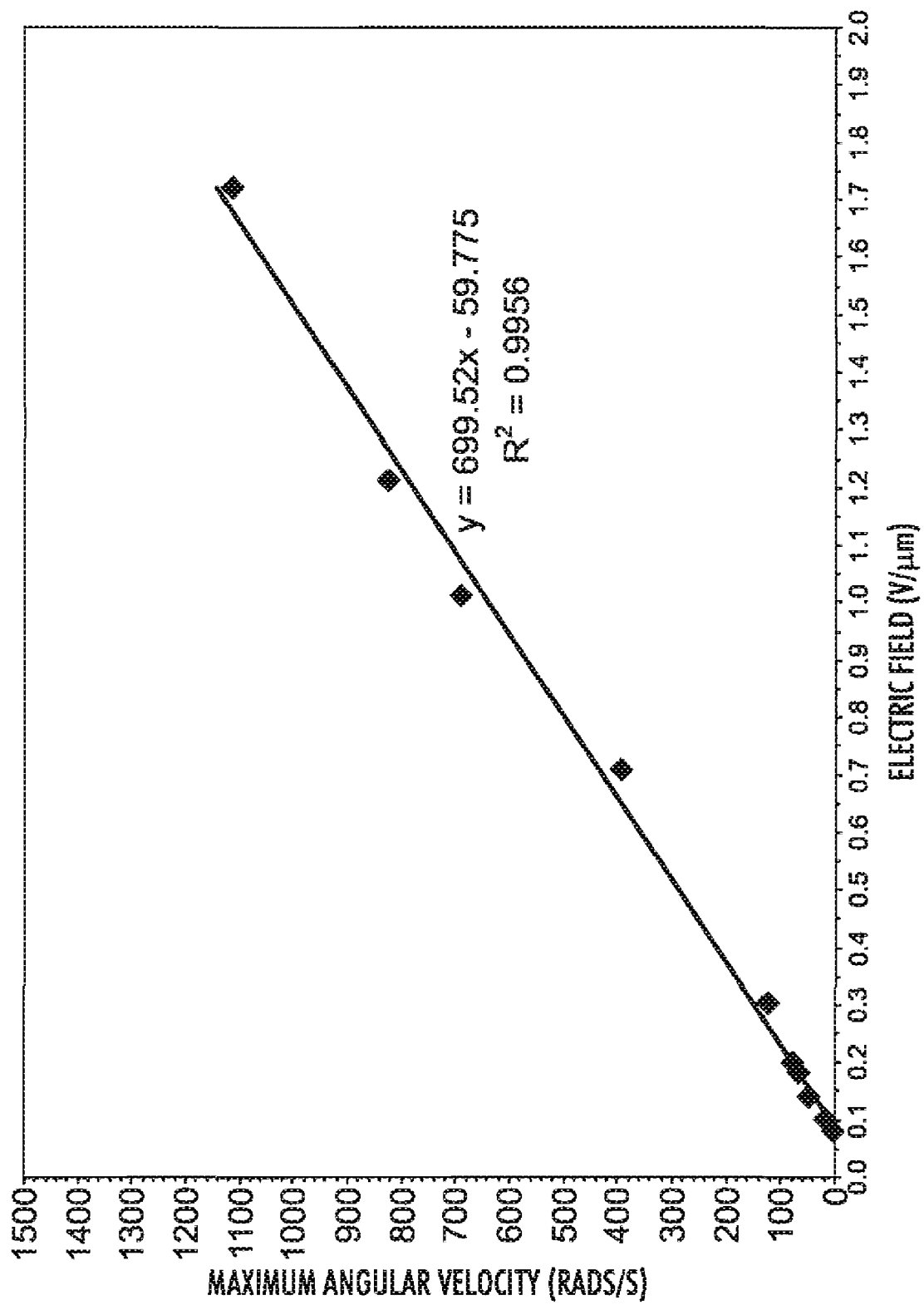

From the reflectance data, the time derivative of reflectance may be calculated, for example as shown in FIG. 7. The rate of change of reflectance is a measure of the angular velocity of the beads. A plot of the maximum angular velocity as a function of electric field may then be derived, for example as shown in FIG. 8. Rotational speed of the beads increases with higher electric fields. The slope of this plot is representative of the rotational mobility of the beads, and is proportional to the dipole charge of the beads.

By comparison of the measured reflectance values against known maximum and minimum reflectance values associated with the beads in the display device, it can be determined whether full rotation of the beads is being effected prior to the bead contacting the cavity wall as it translates. If the measured maximum and minimum reflectance values achieved in the display device are less than the known maximum and minimum reflectance values associated with the beads, then the beads may not be completing the rotational motion within the cavity prior to completing the translational motion, resulting in the beads contacting the cavity wall before fully rotating (which prematurely halts the further rotation of the beads). For example, if a portion of the black surface of the beads are still showing when the white surface is intended to be displayed, full reflectance from the white surface will not be realized.

Figure 9:
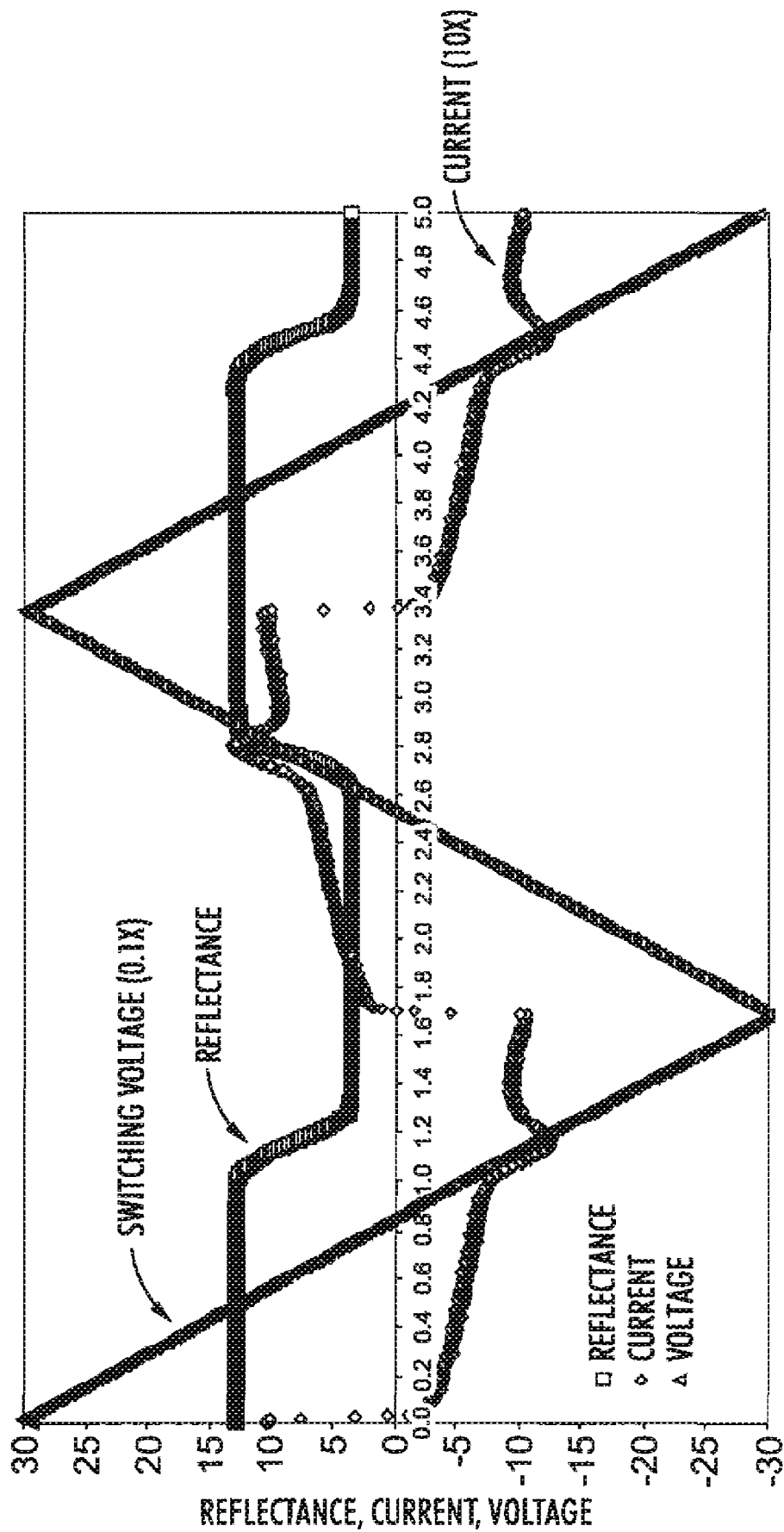
FIGS. 9-11 are plots associated with a determination of the dynamic current of a gyricon display device.

Measurement of dynamic current is done through application of a triangular waveform through the display device. For example, as shown in FIG. 9, the voltage applied is switched at a steady rate, and thus a trace of the current versus time curve shows a triangular pattern as in FIG. 9. FIG. 9 illustrates a switching of the voltage between +30 V and −30 V at a rate of about 1.6 to 1.7 seconds. The sweep rate of the switching voltage needs to be selected such that it is not too rapid. If too rapid, the beads will begin to rotate again before the translational jump is completed.

As the switching voltage is switched in the triangular form, the electrostatic detachment force (monopole charge times electric field) increases. When this detachment force exceeds the adhesive force of the beads to the cavity wall, the beads become detached from the cavity wall and translate and rotate. However, unlike when a rectangular waveform is applied when all beads become detached at the same time, the beads here become detached at various times depending on the magnitude of the monopole charge possessed by each bead.

Figure 10:
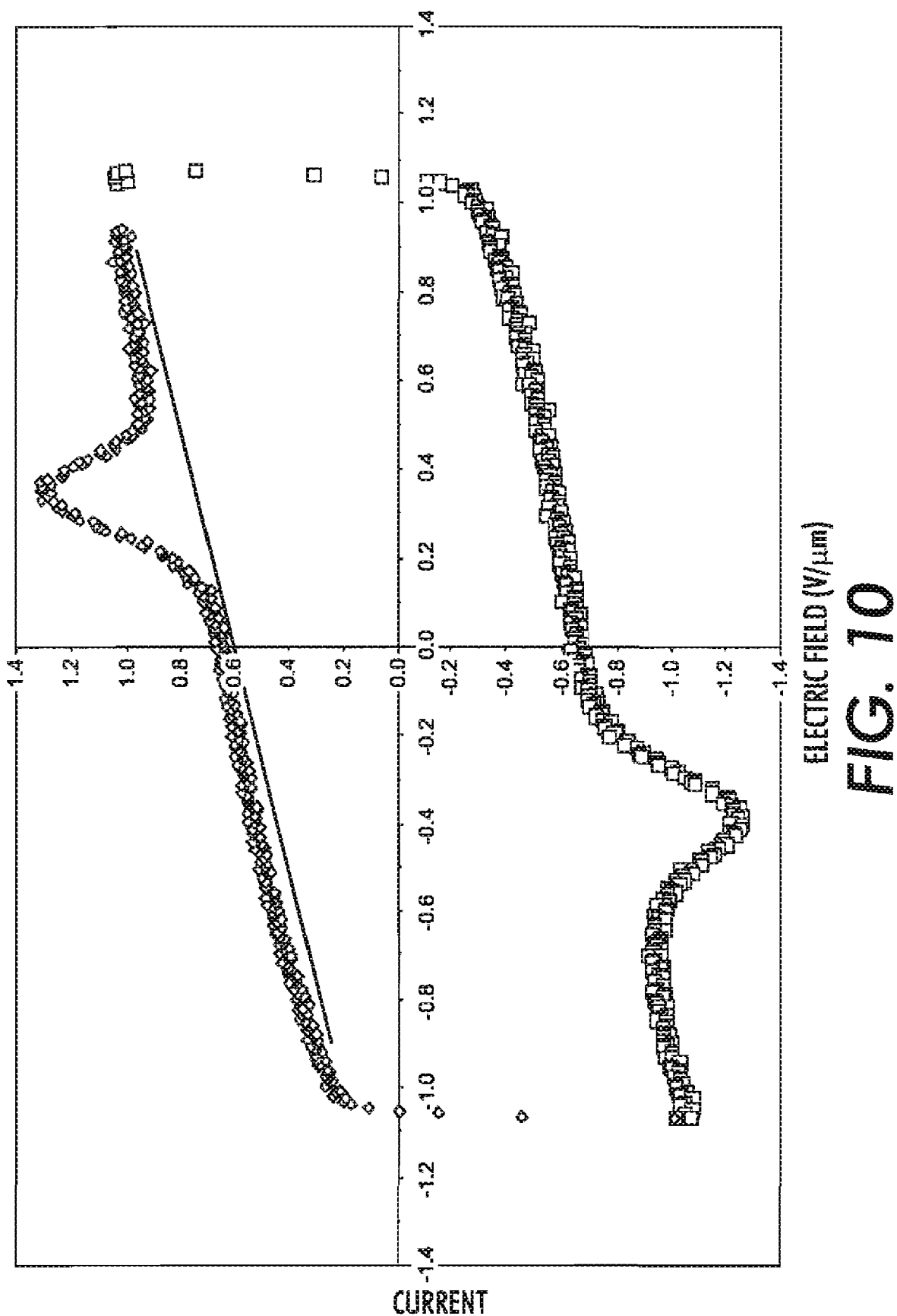

As the switching voltage is applied in the triangular waveform, the current through the device is measured via the electrometer or other suitable device. The reflectance may here again also be measured, as illustrated in FIG. 9. A plot of the current is shown in FIGS. 9 and 10. In FIG. 9, the current is plotted against time, whereas in FIG. 10, it is plotted as a function of the electric field of the switching voltage. In this case, electric field is in units of V/μm, where the μm represents the distance between electrodes in the display device. The current plot shows a single bump or spike therein. This occurs at the point where the beads jump across the gap from one side of the cavity to the other. The peak is rounded instead of a straight up and down spike as a result of the charge distribution among different beads not being completely uniform. The monopole charge of the beads is proportional to the integrated area of the current versus time curve in FIG. 9.

Figure 11:
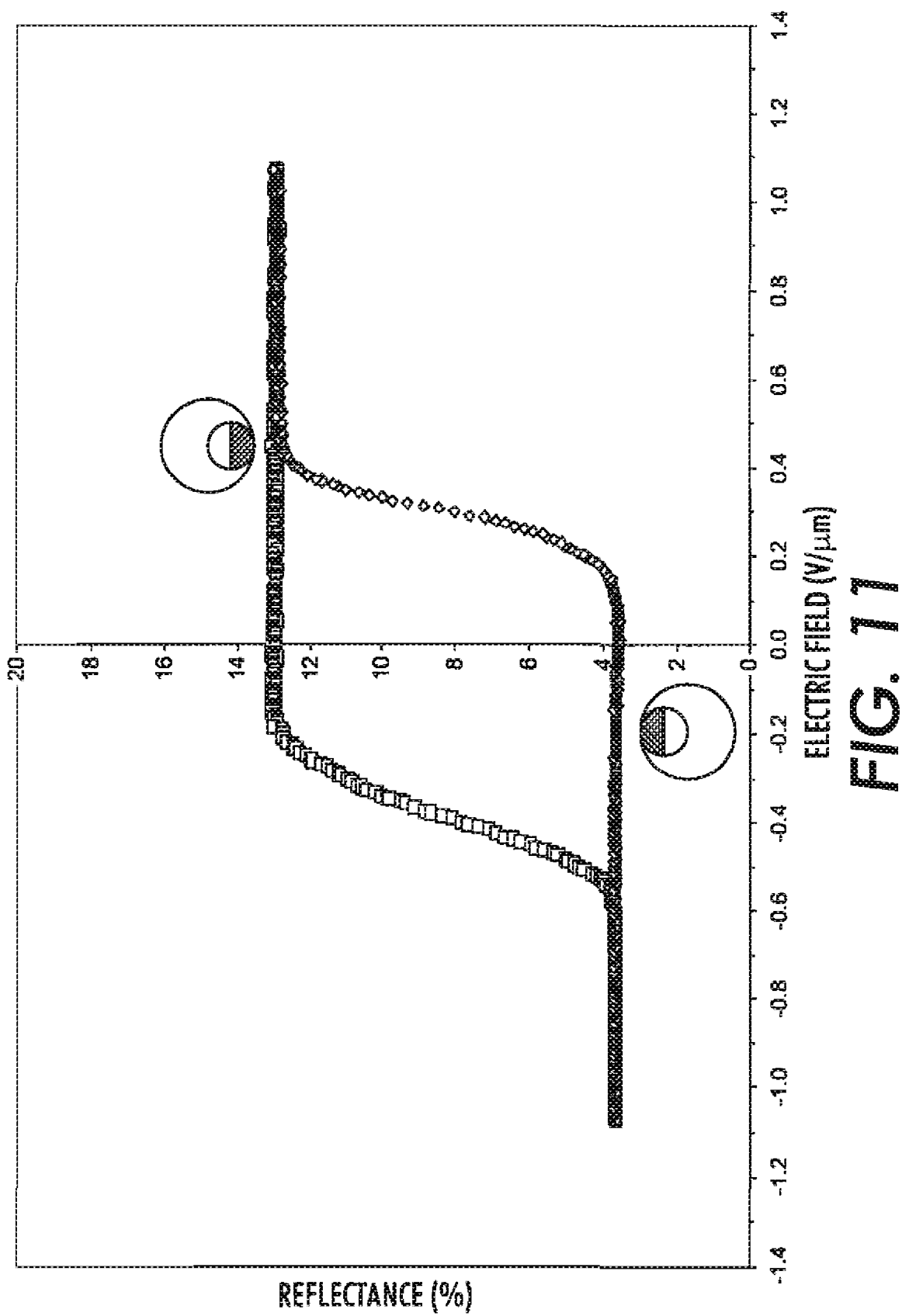

When the current is plotted as a function of electric field as in FIG. 10, the range of electric field is a measure of the charge distribution of the beads. The reflectance may also be plotted as a function of electric field, as shown in FIG. 11. The display device and beads therein are stable if the current versus electric field plot and reflectance versus electric field plot does not change over time.

The reflectance and current as a function of time may be plotted together as in FIG. 9. For optimum operation of the display device, the reflectance plot should show substantial completion of the transition from high reflectance to low reflectance, and vice versa, before the end point of the single spike in the current plot. By substantial completion is intended, for example, that the reflectance transition be at least 75% complete along the reflectance transition line, such as at least 85% or at least 95% complete, and desirably 100% complete, at the point where the spike in the current plot ends. For example, taking the first switching point in FIG. 9, the reflectance transition occurs from about 1.0 (start) to about 1.25 seconds (completion), with a midpoint at about 1.18 seconds. The high point (peak) of the spike in the current plot occurs at about 1.18 seconds, with the end point of the spike (completion) occurring at around 1.3 seconds. Because the end point of the current spike is after the completion of the transition in the reflectance plot, the rotation of the beads was able to be substantially complete before completion of the translation of the beads from one side of the cavity to the other. A similar determination can be made by comparing the plots of current versus electric field (FIG. 10) and reflectance versus electric field (FIG. 11). In FIG. 10, the high point of the current peaks appear at about 0.4 V/μm and about −0.4 V/μm, with the end point of the peaks at about 0.6 V/μm and −0.6 V/μm. In FIG. 11, the reflectance change completes around 0.5 V/μm and −0.5 V/μm. Thus, here again it can be seen that in this display device, rotation of the beads is able to complete before translation of the beads, indicating excellent performance in the display device. The display device thus will have an excellent contrast ratio and display efficiency.

The contrast ratio may be calculated by taking the white state reflectivity divided by the dark state reflectivity. The reflectivity is measured on the y-axis of the plot in FIG. 11. The upper half of the curve represents the reflectivity in the white state, and is approximately 13%, and the lower half of the curve represents the reflectivity in the dark state and is approximately 3.8%. Thus, the calculated contrast ratio is 13/3.8=3.4:1.

As detailed above, the dipole charge may be determined as a relative ratio against the monopole charge. As discussed above, it is desired that the gyricon bead substantially complete or complete a 180° rotation prior to completing translation across the cavity. In this way, the entire white or black (or other colors, as desired) hemisphere is facing the viewer, and contrast between the two color states is maximized. If the dipole/monopole ratio is too high, the bead may translate across the cavity and stick to the cavity wall before rotation is complete, and the contrast thus may be poorer. The dipole/monopole ratio may thus be used as a quality control metric when preparing additional beads. The desired dipole/monopole ratio may vary among different devices, for example due to the use of different materials or designs, and thus there is no overall desired ratio for all devices. Any desired monopole/dipole ratio is acceptable, provided that the gyricon bead completes 180° rotation before translation across the capsule. For a given design of a device, a tolerance ratio can be created by the aforementioned methods to predict whether a particular batch of prepared beads are acceptable, i.e., are within an acceptable tolerance for the dipole/monopole ratio, for that device such that the additionally produced beads are expected to exhibit an acceptable display efficiency with a high level of certainty.

Thus, upon determination that a given gyricon display device has acceptable display efficiency as discussed above, additional identical gyricon display devices may be prepared with an assurance of the additional gyricon display devices having high quality display capabilities and characteristics.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of measuring characteristics of a gyricon display device, comprising:
    locating a display layer between conductive substrates, wherein the display layer comprises beads that exhibit at least two colors of different reflectance disposed within a fluid filled cavity or shell, to form the gyricon display device;
    applying a rectangular or triangular waveform switching voltage to the gyricon display device and measuring a reflectance of the gyricon display device;
    separately applying a triangular waveform switching voltage to the gyricon display device and measuring a current of the display device during the application of the triangular waveform switching voltage; and
    using the measured reflectance and the measured current to determined a contrast ratio and/or a display efficiency of the gyricon display device.

2. The method according to claim 1, wherein the reflectance switches between a higher reflectance state of a first color of the beads and a lower reflectance state of a second color of the beads as the applied rectangular or triangular waveform switching voltage switches between a positive polarity and a negative polarity, the reflectance being associated with a rotational movement of the beads under influence of the applied rectangular or triangular waveform switching voltage.

3. The method according to claim 2, wherein the current is associated with translational movement of the beads in that the current exhibits a spike when the beads detach from a wall of the cavity or shell and move to an opposite side of the cavity or shell under influence of the separately applied triangular waveform switching voltage.

4. The method according to claim 3, wherein the method further comprises determining the display efficiency of the gyricon display device by comparing the measured reflectance to the measured current.

5. The method according to claim 4, wherein the gyricon display device is determined to have an acceptable display efficiency where the rotational movement of the beads is substantially completed prior to completion of the translational movement of the beads.

6. The method according to claim 4, wherein the gyricon display device is determined to have an acceptable display efficiency where a transition in the reflectance is at least 75% complete along a reflectance transition line at a point where the spike in the current ends.

7. The method according to claim 4, wherein the gyricon display device is determined to have an acceptable display efficiency where a transition in the reflectance is 100% complete along a reflectance transition line at a point where the spike in the current ends.

8. A method of determining a monopole charge and a dipole charge of beads in a gyricon display device, wherein the gyricon display device comprises a display layer sandwiched between conductive substrates, and wherein the display layer comprises beads that exhibit at least two colors of different reflectance disposed within a fluid filled cavity or shell, the method comprising:
   applying a rectangular waveform switching voltage to the gyricon display device and measuring reflectance of the display device, and determining the dipole charge based upon the measured reflectance; and
   separately applying a triangular waveform switching voltage to the gyricon display device and measuring current of the display device, and determining the monopole charge based upon the measured current.

9. The method according to claim 8, wherein the determining of the dipole charge based upon the measured reflectance comprises first determining a rate of change of reflectance to determine angular velocity of the beads, and second determining a slope of a plot of the angular velocity as a function of electric field of the switching voltage.

10. The method according to claim 8, wherein the determining of the monopole charge based upon the measured current comprises determining a slope of a plot of current as a function of electric field of the switching voltage.

11. The method according to claim 8, wherein the reflectance transitions between a higher reflectance state of a first color of the beads and a lower reflectance state of a second color of the beads as the switching voltage switches between a positive polarity and a negative polarity.

12. The method according to claim 8, wherein the current exhibits a spike when the beads detach from a wall of the cavity or shell and move to an opposite side of the cavity or shell under influence of the switching voltage.

13. The method according to claim 8, wherein the method further comprises determining the display efficiency of the gyricon display device by comparing the measured reflectance to the measured current.

14. The method according to claim 13, wherein the gyricon display device is determined to have an acceptable display efficiency where a transition in the reflectance is at least 75% complete along a reflectance transition line at a point where a spike in the current ends.

15. The method according to claim 13, wherein the gyricon display device is determined to have an acceptable display efficiency where a transition in the reflectance is 100% complete along a reflectance transition line at a point where the spike in the current ends.

16. The method according to claim 13, wherein the gyricon display device is determined to have an acceptable display efficiency where a plot of the reflectance as a function of electric field of the switching voltage exhibits completion of a transition in the reflectance at a point prior to an end point of a spike in the current in a plot of the current as a function of electric field of the switching voltage.

17. The method according to claim 8, wherein the method further comprises determining a ratio of the dipole charge to the monopole charge for the beads of the display layer, setting a tolerance for the ratio in which the beads of the display layer would exhibit an acceptable display efficiency, preparing additional beads and determining a dipole charge to monopole charge for the additional beads, and determining if the dipole charge to monopole charge of the additional beads is within the set tolerance so that the additional beads may be used in preparing an additional display device.

18. A method of measuring characteristics of gyricon display devices, comprising:
   preparing a first gyricon display device comprising a display layer between conductive substrates, wherein the display layer comprises beads that exhibit at least two colors of different reflectance disposed within a fluid filled cavity or shell, to form the first gyricon display device;
   applying a first waveform switching voltage to the first gyricon display device and measuring reflectance of the gyricon display device, and determining a dipole charge of the beads based upon the measured reflectance;
   applying a second waveform switching voltage to the first gyricon display device and measuring current of the display device, and determining a monopole charge of the beads based upon the measured reflectance;
   determining a ratio of the dipole charge to the monopole charge for the beads, wherein if the measured reflectance and measured current indicate that a transition in the reflectance under influence of the switching voltage is substantially complete to complete prior to an end point of a spike in the current under influence of the switching voltage, setting a tolerance for the ratio in which the beads would exhibit an acceptable display efficiency; and
   preparing additional beads and determining a dipole charge to monopole charge for the additional beads, and determining if the dipole charge to monopole charge of the additional beads is within the set tolerance so that the additional beads may be used in preparing an additional display device identical in structure to the first gyricon display device.

19. The method according to claim 18, wherein the first waveform switching voltage is a rectangular waveform and the second waveform switching voltage is a triangular waveform.

20. The method according to claim 18, wherein the first waveform switching voltage and the second waveform switching voltage are both a triangular waveform that is applied at the same time.

* * * * *